United States Patent
Truckenbrod et al.

(10) Patent No.: US 8,476,872 B2
(45) Date of Patent: Jul. 2, 2013

(54) SYSTEMS AND METHODS OF REDUCING A LOAD ON AN ENGINE

(75) Inventors: Gregory R. Truckenbrod, Fridley, MN (US); William L. Waldschmidt, Randolph, MN (US); John Steven McFadden, Woodbury, MN (US); Vidhey Vijay Trivedi, Nagpur (IN)

(73) Assignee: Thermo King Corporation, Minneapolis, MN (US)

( * ) Notice: Subject to any disclaimer, the term of this patent is extended or adjusted under 35 U.S.C. 154(b) by 506 days.

(21) Appl. No.: 12/855,222

(22) Filed: Aug. 12, 2010

(65) Prior Publication Data

US 2011/0037441 A1 Feb. 17, 2011

Related U.S. Application Data

(60) Provisional application No. 61/233,265, filed on Aug. 12, 2009.

(51) Int. Cl.
*H02P 9/00* (2006.01)

(52) U.S. Cl.
USPC ............................................. 322/28; 322/22

(58) Field of Classification Search
USPC .................... 322/22, 25, 27, 28, 37
See application file for complete search history.

(56) References Cited

U.S. PATENT DOCUMENTS

| | | | |
|---|---|---|---|
| 3,329,886 A | | 7/1967 | Wier |
| 4,379,990 A | * | 4/1983 | Sievers et al. .................... 322/99 |
| 4,459,631 A | * | 7/1984 | McNamee ...................... 361/21 |
| 4,470,003 A | * | 9/1984 | Mitchell .......................... 322/23 |
| 4,629,968 A | | 12/1986 | Butts et al. |
| 4,651,081 A | * | 3/1987 | Nishimura et al. ............ 320/123 |
| 4,682,044 A | * | 7/1987 | Hotate et al. .................. 290/40 B |
| 4,805,571 A | | 2/1989 | Humphrey |
| 5,080,059 A | | 1/1992 | Yoshida et al. |
| 5,231,344 A | | 7/1993 | Marumoto et al. |
| 5,256,959 A | | 10/1993 | Nagano et al. |
| 5,481,176 A | | 1/1996 | De Biasi et al. |
| 5,502,368 A | * | 3/1996 | Syverson et al. ................ 322/28 |
| 5,719,485 A | | 2/1998 | Asada |
| 5,859,525 A | | 1/1999 | Minks |

(Continued)

FOREIGN PATENT DOCUMENTS

EP 0326188 8/1989

OTHER PUBLICATIONS

Autoblog Green, "BMW's 'Brake Energy Regeneration' technology" weblog, May 21, 2009, 9 pages, retrieved on Aug. 24, 2009 from http://green.autoblog.com/2009/05/21/bmws-brake-energy-regeneration-technology/.

*Primary Examiner* — Nicholas Ponomarenko
(74) *Attorney, Agent, or Firm* — Michael Best & Friedrich LLP

(57) ABSTRACT

A system for reducing an alternator's load on an engine when the engine drives a second load. The system includes an alternator, a battery, a resistor, and a switch. The alternator includes a stator, a voltage regulator, a rectifier, and a field coil. The battery has a first terminal coupled to the alternator and a second terminal coupled to the alternator. The resistor has a first lead coupled to the first terminal and a second lead coupled to the field coil. The switch is coupled in parallel across the resistor, and is open when the engine drives the second load and closed when the engine is not driving the second load.

15 Claims, 3 Drawing Sheets

U.S. PATENT DOCUMENTS

| | | | |
|---|---|---|---|
| 6,215,285 B1 * | 4/2001 | Harmon | 322/29 |
| 6,404,163 B1 | 6/2002 | Kapsokavathis et al. | |
| 6,541,943 B1 * | 4/2003 | Wylie et al. | 322/28 |
| 6,731,098 B1 | 5/2004 | Hintz et al. | |
| 6,867,569 B2 * | 3/2005 | Taniguchi et al. | 322/28 |
| 7,011,591 B2 | 3/2006 | Nakamura | |
| 7,078,881 B2 * | 7/2006 | Aoyama | 322/28 |
| 7,312,547 B2 | 12/2007 | Moore et al. | |
| 7,573,155 B2 | 8/2009 | Lawahmeh et al. | |
| 2004/0067803 A1 | 4/2004 | Nakamura | |
| 2005/0285445 A1 | 12/2005 | Wruck et al. | |

\* cited by examiner

SYSTEMS AND METHODS OF REDUCING A LOAD ON AN ENGINE

RELATED APPLICATIONS

The present application claims the benefit of prior filed co-pending U.S. Provisional Patent Application No. 61/233,265; filed on Aug. 12, 2009; the entire content of which is hereby incorporated by reference.

BACKGROUND

Large over-the-road trucks often include sleeping quarters in the cab of the truck. These sleeping quarters allow a driver to stay in the cab during mandatory rest periods. To maintain a comfortable environment for the driver, the cabs include heating and air conditioning systems. These systems are powered by the large diesel engines of the truck, requiring that the driver idle the engine while sleeping in the cab. The idling diesel engine, in addition to exhaust, produces much more power than is required by the heating or air conditioning system. As an alternative, an auxiliary engine, such as an engine used for cooling a refrigerated trailer, can be used to power the heating and/or air conditioning system, eliminating the need to idle the truck's diesel engine. Further, the auxiliary engine can drive an alternator which charges the batteries of the truck.

During operation of a cab air conditioning system, when the temperature of the cab rises above a threshold, the air conditioning system is engaged to cool the cab. When the temperature of the cab drops below a second threshold, the air conditioning system is disengaged. The auxiliary engine is typically capable of producing enough power to power all of its attached components (e.g., cab air conditioner, alternator) simultaneously. Because several of the components are often times not actively powered (e.g., when the cab air conditioner is disengaged), the auxiliary engine is oversized for some of the time, and thus uses more fuel than is needed to power the operating components.

SUMMARY

The invention relates to an adaptive alternator which reduces the amount of power it consumes when a cab air conditioner is engaged, allowing a smaller auxiliary engine to be used, resulting in fuel savings with little or no loss of comfort for a driver.

In one embodiment, the invention provides an engine power system. The engine power system includes an engine which drives a driven load (e.g., a cab air conditioning system) and an adaptive alternator. The driven load has a first operating state in which the driven load produces a first load on the engine, and a second operating state in which the driven load produces a relatively larger, second load on the engine. The driven load provides a signal to the adaptive alternator indicating which operating state the driven load is operating in. The adaptive alternator receives the signal from the driven load and generates a first amount of power and a first alternator load on the engine when the driven load is operating in the first operating state, and a second, lesser amount of power and a second, lesser alternator load on the engine when the driven load is operating in the second operating state. The difference between the first alternator load on the engine and the second, lesser alternator load on the engine at least partially offsets the increase in the load on the engine produced by the driven load between the first operating state and the second operating state.

In another embodiment, the invention provides a method of offsetting an increased load placed on an engine by a first load when the first load switches from a first operating state to a second operating state. The method includes driving the first load by the engine, driving an alternator by the engine, operating the first load in a first operating state, providing a first signal to the alternator that the first load is operating in the first operating state, operating the alternator in a first alternator operating state, operating the first load in a second operating state, providing a second signal to the alternator that the first load is operating in the second operating state, and switching the operating state of the alternator from the first alternator operating state to a second alternator operating state based on the alternator receiving the second signal.

In another embodiment, the invention provides a system for reducing an alternator's load on an engine when the engine drives a second load. The system includes an alternator, a battery, a resistor, and a switch. The alternator includes a stator, a voltage regulator, a rectifier, and a field coil. The battery has a first terminal coupled and a second terminal, both of which are coupled to the alternator. The resistor has a first lead coupled to the first terminal and a second lead coupled to the field coil. The switch is coupled in parallel across the resistor, and is open when the engine drives the second load and closed when the engine is not driving the second load.

In another embodiment, the invention provides a truck. The truck includes a cab, an air conditioner, an engine, an alternator, and a battery. The air conditioner is driven by the engine and configured to cool the cab. The alternator is driven by the engine and coupled to the air conditioner. The alternator receives a signal from the air conditioner indicating whether the air conditioner is operating or not operating. Based on the signal, the alternator applies a first load on the engine when the air conditioner is operating and applies a second load on the engine when the air conditioner is not operating. The first load is less than the second load. The battery is charged by the alternator.

In another embodiment, the invention provides a method of reducing a load on an engine. The method includes an alternator driven by the engine, and applying a first load on the engine. A second load is connected to the engine, and provides a signal in response to the second load being connected with the engine. The alternator applies a third load on the engine based on the signal. Applying the third load on the engine includes removing the second load from the engine, the third load being less than the second load.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
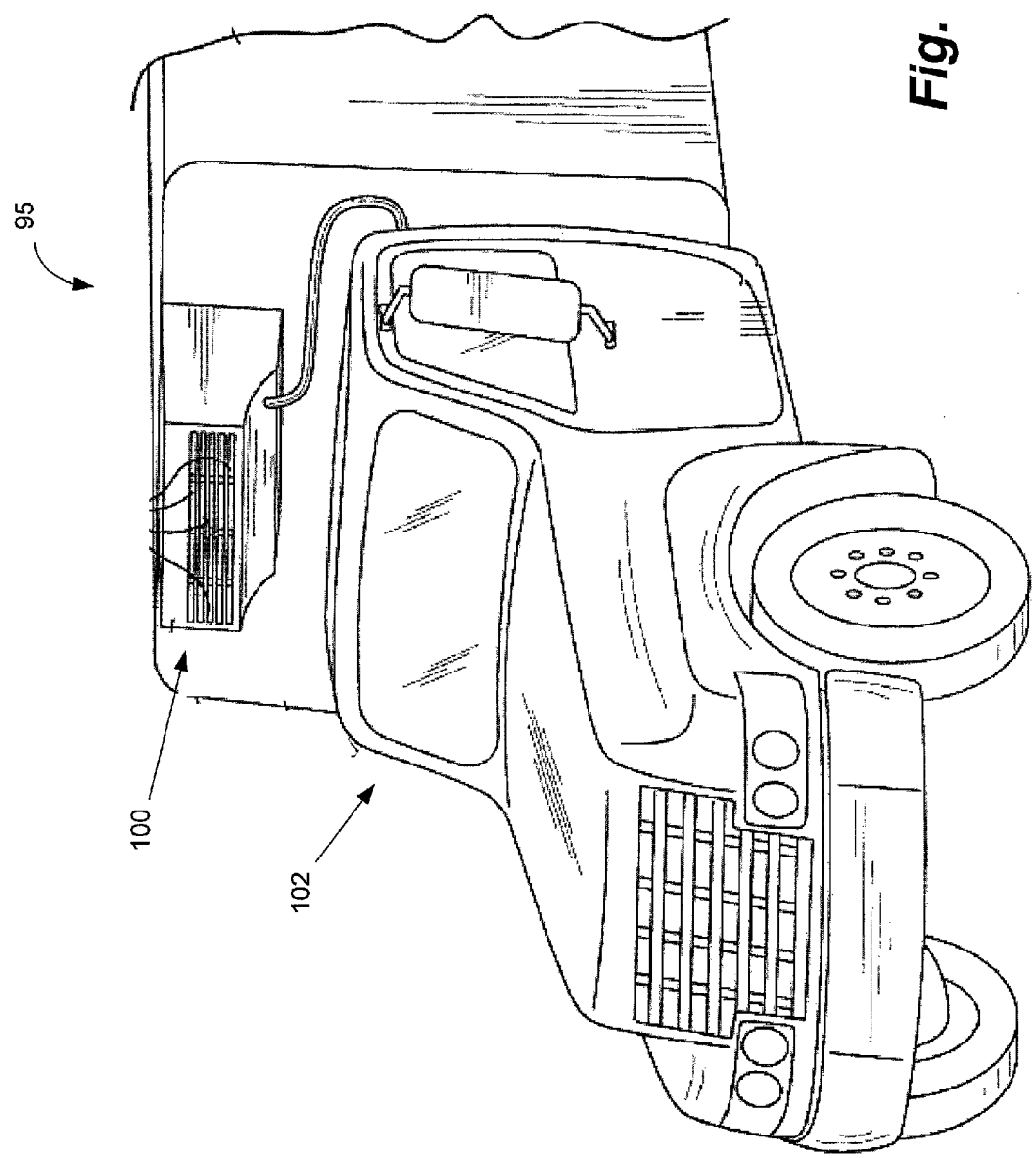
FIG. 1 is a partial plan view of an exemplary truck.
Figure 2:
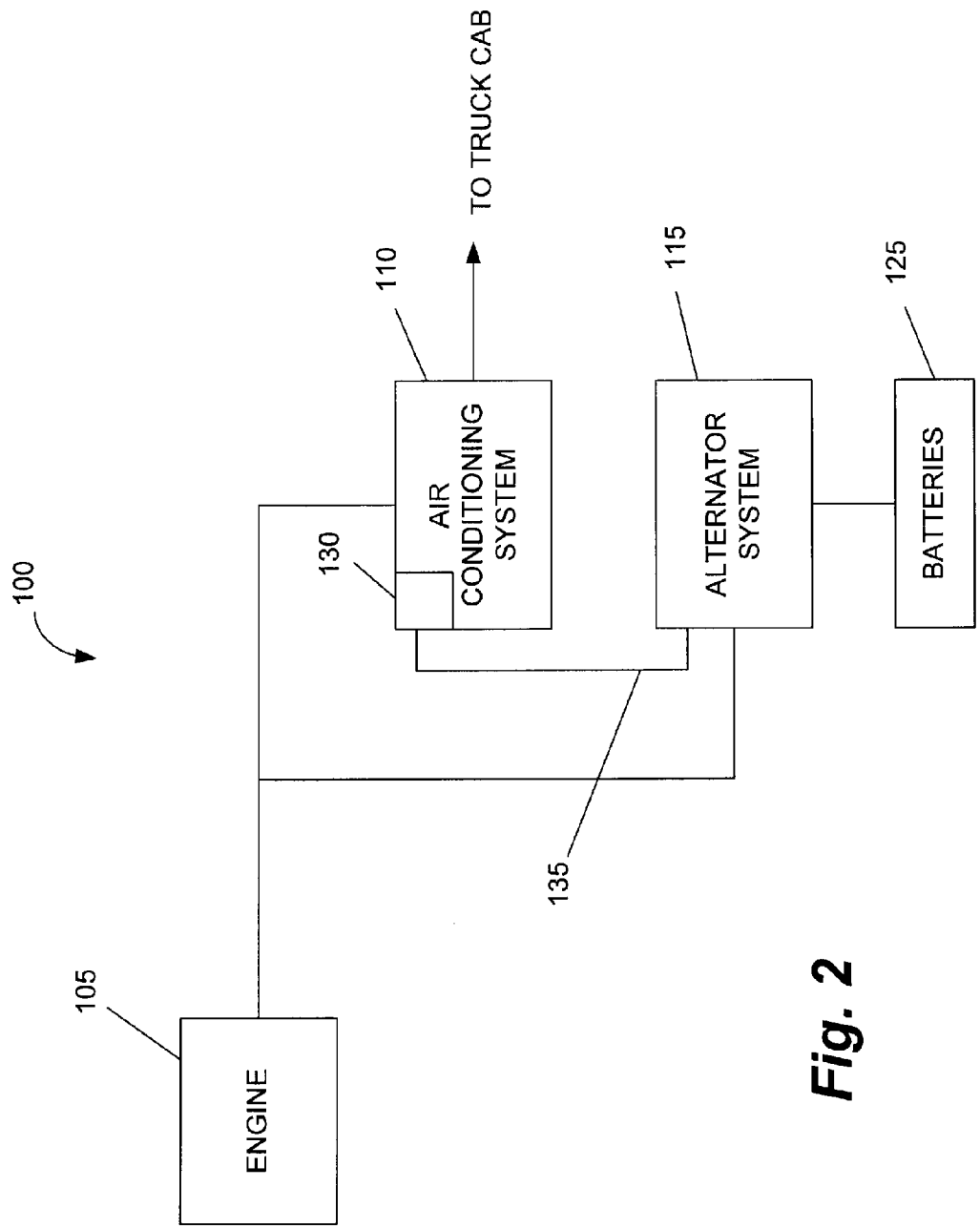
FIG. 2 is a block diagram of a construction of an engine power system including an adaptive alternator.

FIG. 1 shows a truck 95 for implementing a construction of an auxiliary engine power system 100. The truck 95 includes a cab 102 and the auxiliary engine power system 100. FIG. 2 shows a block diagram of the auxiliary engine power system 100. In the construction shown, the system 100 includes an auxiliary engine 105 driving a cab air conditioning system 110, and an alternator system 115. The alternator system 115 converts the mechanical power of the engine 105 into electricity for charging and/or maintaining a charge of one or more batteries 125 of a truck for example. The air conditioning system 110 includes a clutch 130. The clutch 130 engages and disengages the engine 105 from a compressor of the air conditioning system 110 (e.g., under the control of a thermostat in a cab of the truck).

The load placed on the engine 105 by the air conditioning system 110 is greater when the clutch 130 is engaged than when the clutch 130 is not engaged. The clutch 130 provides a signal 135 to the alternator system 115 indicating whether or not the clutch 130 is engaged. The alternator system 115 adjusts the amount of power it produces based on the signal 135 from the clutch 130. That is, the alternator system 115 produces a reduced amount of power when the clutch 130 is engaged, and produces its full power when the clutch 130 is disengaged. When the alternator system 115 is producing less power, the load the alternator system 115 is placing on the engine 105 is also less. Thus, the load on the engine 105 is reduced, allowing a smaller engine to be used in the system 100.

Figure 3:
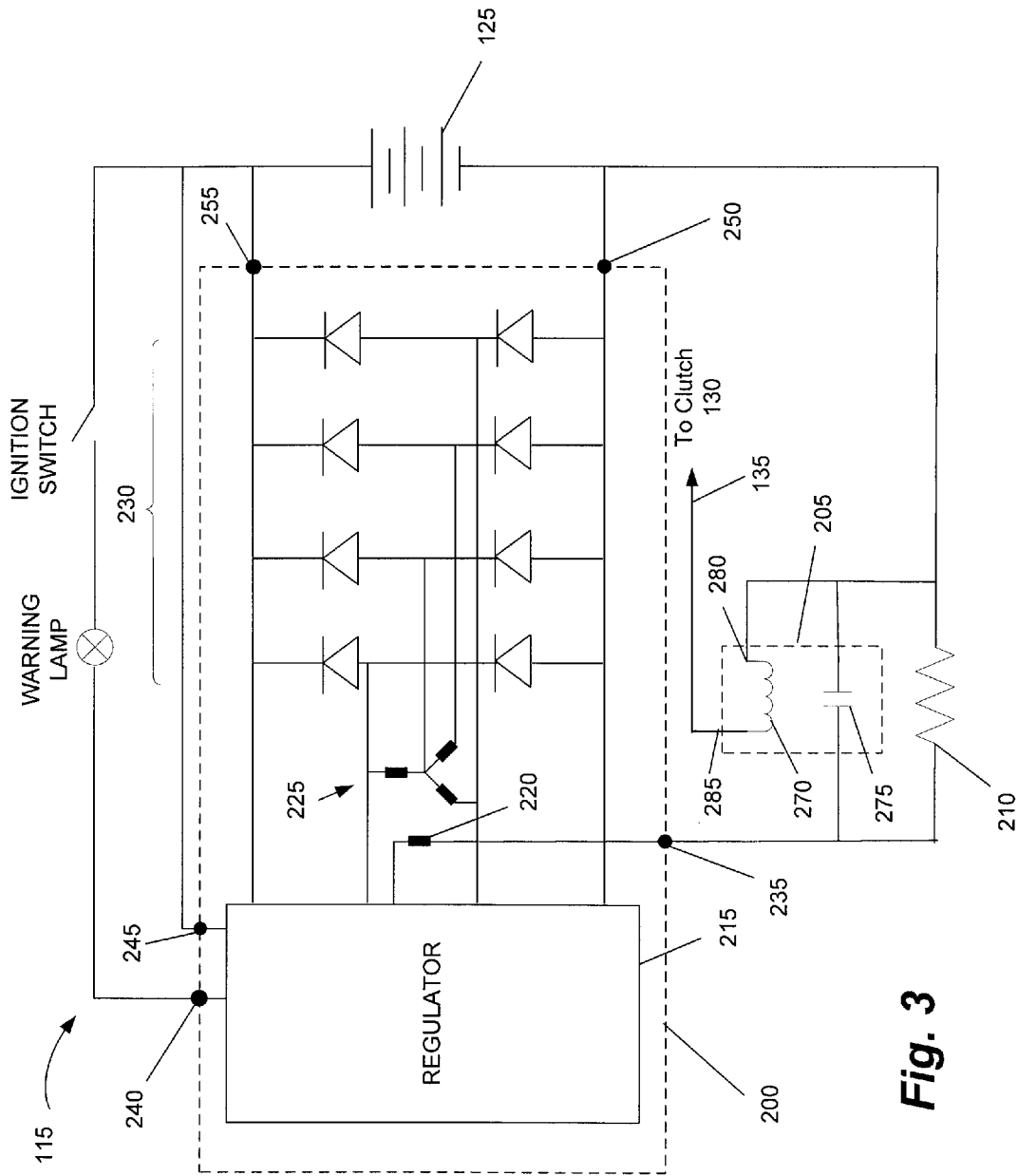
FIG. 3 is a schematic diagram of a construction of the adaptive alternator of FIG. 2.

FIG. 3 shows a construction of an alternator system 115 capable of reducing the amount of power it produces based on the signal 135. The system 115 includes an alternator 200, a relay 205, a resistor 210, and the battery 125. The alternator 200 includes a voltage regulator 215, a field coil 220, a plurality of stator coils 225, and a rectifier 230. The alternator 200 also includes a field connection 235, an excite connection 240, a sense connection 245, a battery negative connection 250, and a battery positive connection 255. In some constructions, the relay 205 is an electronic switch (e.g., a FET, an IGBT, etc.).

The alternator 200 also includes a rotor. The engine 105 rotates the rotor via a belt. The rotating rotor generates alternating current (AC) electricity in the stator coils 225. The voltage generated by the stator coils 225 is dependent on the current flowing through the field coil 220. The AC electricity is supplied to the rectifier 230 which converts the AC electricity into direct current (DC) electricity.

The relay 205 includes a coil 270 and normally-closed contacts 275. A first terminal 280 of the coil 270 is connected to the battery negative connection 250. A second terminal 285 of the coil 270 is connected to the signal line 135 of the clutch 130.

In operation, when the air conditioning system 110 is not engaged, the signal line 135 is connected to the battery negative connection 250 (or ground) or is open. As a result, no current flows through the coil 270, and the normally-closed contacts 275 are closed. Thus, the battery negative connection 250 is connected directly to the field coil 220 allowing the maximum possible current to flow in the field coil 220, and the alternator 200 to produce its maximum power.

When the air conditioning system 110 is engaged (and loading the engine 105), the signal line 135 is connected to the battery positive connection 255. Current then flows through the coil 270 causing the normally-closed contacts 275 to open. With the normally-closed contacts 275 open, current flows through the resistor 210, reducing the current flowing through the field coil 220. As a result, the power produced by the alternator 200 is reduced, reducing the load placed on the engine 105 by the alternator 200, and offsetting the load placed on the engine 105 by the air conditioning system 110.

Other constructions are possible. For example, relay 205 can have normally-open contacts and coil 270 can be powered when the air conditioning system 110 is not engaged. Various sizes of resistors can be chosen to provide an appropriate power reduction for a particular air conditioning system 110. In some constructions, the signal 135 is provided by a controller or thermostat rather than the clutch 130. The alternator system 200 can be linked with systems that draw power from the engine 105 other than the air conditioning system 110, offsetting the load placed on the engine 105 by these other systems.

Thus, the invention provides, among other things, an adaptive alternator.

What is claimed is:

1. A system for reducing an alternator's load on an engine when the engine drives a second load, the system comprising:
   an alternator including a stator, a voltage regulator, a rectifier, and a field coil;
   a battery having a first terminal and a second terminal both of which are coupled to the alternator;
   a resistor having a first lead coupled to the first terminal and a second lead coupled to the field coil; and
   a switch coupled in parallel across the resistor, the switch being open when the engine drives the second load and closed when the engine is not driving the second load;
   wherein the switch receives a signal from the second load indicating when the engine is driving the second load.

2. The system of claim 1, wherein the switch includes a relay, and a coil of the relay receives the signal.

3. The system of claim 2, wherein the coil is coupled between the first terminal and the second load.

4. The system of claim 1, wherein an output of the alternator charges a battery.

5. The system of claim 1, wherein a current passing through the field coil is reduced when the switch is open, wherein the reduction of the current reduces an output of the alternator and reduces the alternator's load on the engine.

6. A truck electrical control system, comprising:
   an air conditioner driven by an engine and configured to cool a cab of a truck;
   an alternator driven by the engine and coupled to the air conditioner, the alternator receiving a signal from the air conditioner indicating whether the air conditioner is operating or not operating, the alternator applying a first load on the engine when the air conditioner is not operating and applying a second load on the engine when the air conditioner is operating, the second load being less than the first load;
   a switch, the signal opening the switch to transition the alternator from the first load to the second load; and
   a battery charged by the alternator;
   wherein the opening of the switch routes current supplied to the field coil through a resistor, wherein the routing of the current through the resistor reduces a field current and reduces an output of the alternator.

7. The truck of claim 6, wherein the difference between the first load and the second load offsets a portion of a load placed on the engine by the air conditioner.

8. The truck of claim 6, wherein the air conditioner includes a clutch, the clutch engaging when the cab requires cooling and disengaging when the cab does not require cooling, and wherein the clutch provides the signal to the alternator.

9. The truck of claim 8, wherein the clutch is engaged when the air conditioner is operating and is disengaged when the air conditioner is not operating.

10. The truck of claim 6, wherein the switch includes a relay and the signal drives a coil of the relay to open a pair of normally-closed contacts.

11. A method of reducing an alternator load on an engine when the engine drives a second load, the method comprising:
   driving an alternator by the engine;
   applying, by the alternator, a first load on the engine;
   connecting a second load to the engine;
   providing a signal by the second load in response to the second load connecting with the engine;
   receiving the signal by the alternator;
   opening a switch by the signal, the switch connected in parallel with a resistor, the switch and resistor coupled between a battery terminal and a field coil of the alternator; and
   reducing the first load on the engine when the alternator receives the signal,
   wherein the opening of the switch reduces a current supplied to a field coil of the alternator, wherein a resistor reduces a current supplied to the field coil reducing an output of the alternator and reducing the first load.

12. The method of claim 11, further comprising reducing a current supplied to a field coil of the alternator when the alternator receives the signal.

13. The method of claim 11, further comprising driving a coil of a relay by the signal, the coil opening a set of contacts of the relay, wherein the set of contacts is connected in parallel with a resistor, and the set of contacts and the resistor are coupled between a battery terminal and a field coil of the alternator.

14. The method of claim 13, further comprising providing a current to a field coil of the alternator, wherein the field coil is connected in series with the set of contacts and resistor.

15. The method of claim 14, wherein the current is reduced when the set of contacts open, wherein the reduced current reduces an output of the field coil and reduces an output of the alternator.

* * * * *